Figure 1:
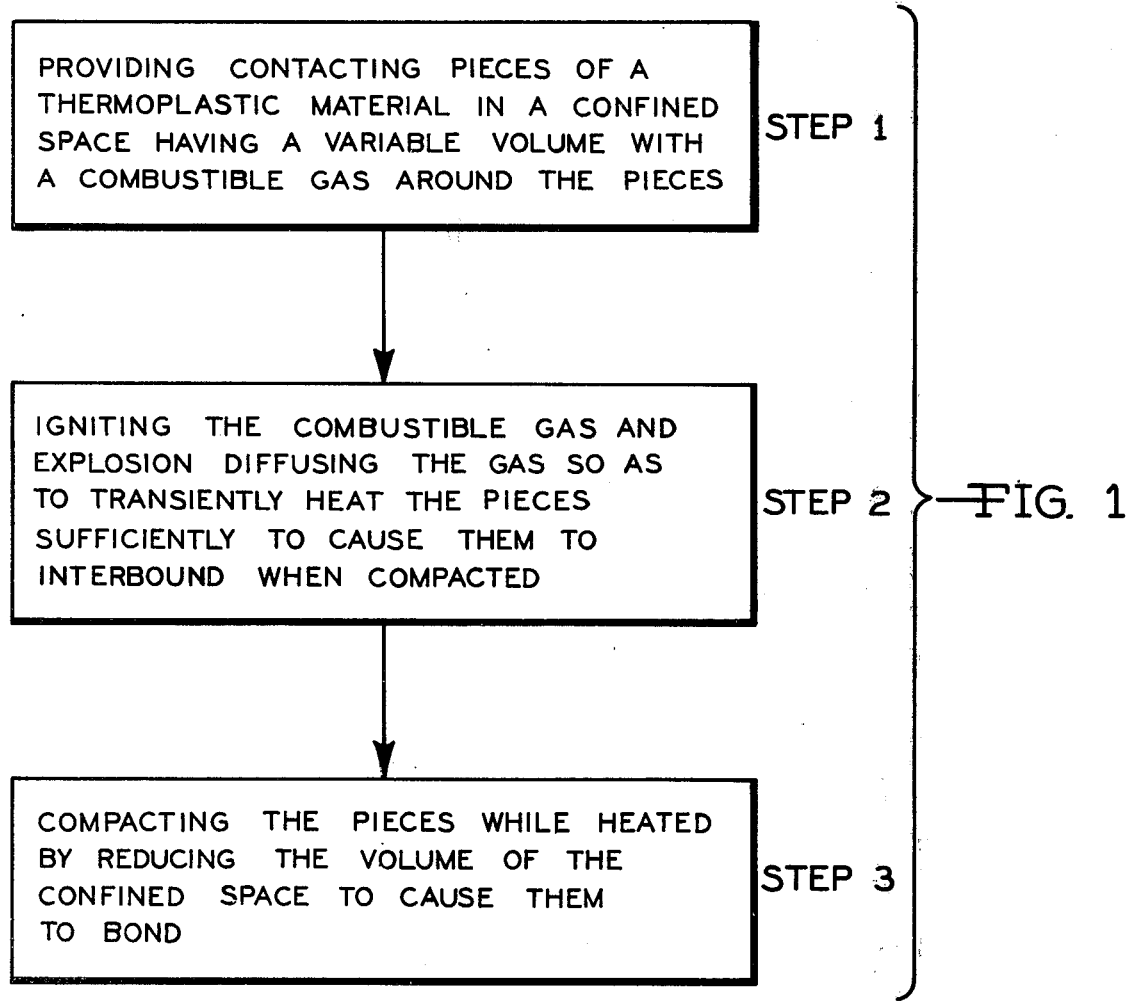

United States Patent [19]

Torbet et al.

[11] 4,155,795
[45] May 22, 1979

[54] APPARATUS FOR THE THERMAL BONDING OF CONTACTING PIECES OF A THERMOPLASTIC MATERIAL

[75] Inventors: Christopher J. Torbet, Ann Arbor; Warren A. Rice, Dexter; Clarence S. Vinton, Ann Arbor, all of Mich.

[73] Assignee: Chemotronics International, Inc., Ann Arbor, Mich.

[21] Appl. No.: 864,267

[22] Filed: Dec. 27, 1977

Related U.S. Application Data

[62] Division of Ser. No. 828,349, Aug. 29, 1977, Pat. No. 4,106,970.

[51] Int. Cl.² .............................................. B32B 35/00
[52] U.S. Cl. ................................. 156/381; 156/382; 264/84; 264/321; 431/7
[58] Field of Search .................. 156/381, 382; 264/84, 264/125, 321; 431/7

[56] References Cited

U.S. PATENT DOCUMENTS

| | | | |
|---|---|---|---|
| 2,185,549 | 1/1940 | Gault | 431/7 |
| 3,175,025 | 3/1965 | Geen et al. | 264/321 |
| 3,239,585 | 3/1966 | Karpovich et al. | 264/321 |
| 3,329,759 | 7/1967 | Rice | 264/321 |

*Primary Examiner*—Caleb Weston
*Attorney, Agent, or Firm*—Ian C. McLeod

[57] ABSTRACT

An improved method is described for thermally bonding contacting pieces of a thermoplastic material provided in a variable volume confined space surrounded by a combustible gas. The combustible gas is ignited and explosion diffused externally of the pieces of thermoplastic material and thus heats the pieces without damage sufficiently to produce interbonding when the heated pieces are compacted in the confined space. The heated pieces are compacted isostatically or non-isostatically using various apparatus which reduce the volume of the confined space. Preferably a moveable piston is provided in a cylinder to form the confined space for the pieces. The driving means for the piston can be a combustible gas which is ignited or non-combustible gas under pressure or a resilient means or other mechanical means. The products of the method are in the form of a porous mass composed of the interbonded pieces which are undamaged by the explosion.

5 Claims, 5 Drawing Figures

APPARATUS FOR THE THERMAL BONDING OF CONTACTING PIECES OF A THERMOPLASTIC MATERIAL

This is a division of application Ser. No. 828,349, filed Aug. 29, 1977, now U.S. Pat. No. 4,106,970.

SUMMARY OF INVENTION

The present invention relates to an improved method for thermally bonding contacting pieces of a thermoplastic material by compaction of heated pieces to cause them to interbond. In particular, the present invention relates to a method for interbonding the contacting pieces by compacting the pieces while they are heated from an ignited and explosion diffused combustible gas provided in a confined space with the pieces and apparatus for accomplishing this result.

PRIOR ART

U.S. Pat. No. 3,175,025, owned by applicants' assignee, describes the prior art method upon which the method of the present invention is an improvement. As shown in Example XIII of this patent, pieces of a flexible reticulated polyurethane foam are packed into a chamber which is closed with a cover so as to form a confined space. The chamber is evacuated of air and then filled with a combustible gas so that it surrounds the contacting pieces of foam. The combustible gas is ignited so as to heat the pieces sufficiently to produce interbonding between the pieces as well as to cause reticulation (membrane removal). The bonding of pieces in various other forms without reticulation is also described. It was found that the bonds between pieces were not strong and the pieces were explosion damaged, particularly near where the combustible gas was ignited, requiring extensive trimming and as a result the products of the method have not gained commercial acceptance.

U.S. Pat. No. 3,329,759 (also owned by applicants' assignee) in Example IX particularly describes an improved method wherein pieces of a thermoplastic material are provided in a confined space in the form of a cylinder fitted with a piston. The confined space is filled with a non-combustible gas which is compressed substantially adiabatically with the piston to heat the gas and thus the pieces and to compact the heated pieces to cause them to interbond. The problem with this method is that the bond between pieces is also not strong enough to produce commercially usable products and the extent of compaction is difficult to control.

OBJECTS

It is therefore an object of the present invention to provide an improved method for thermally bonding contacting pieces of a thermoplastic material by burning a combustible gas around the pieces to heat the pieces so as to produce undamaged bonded products. It is particularly an object of the present invention to provide a method which reproducibly and economically produces undamaged products. These and other objects will become increasingly apparent by reference to the following description and to the drawing.

IN THE DRAWING

FIG. 1 is a schematic diagram showing steps 1 to 3 of the method of the present invention for bonding contacting thermoplastic pieces.

Figure 2:
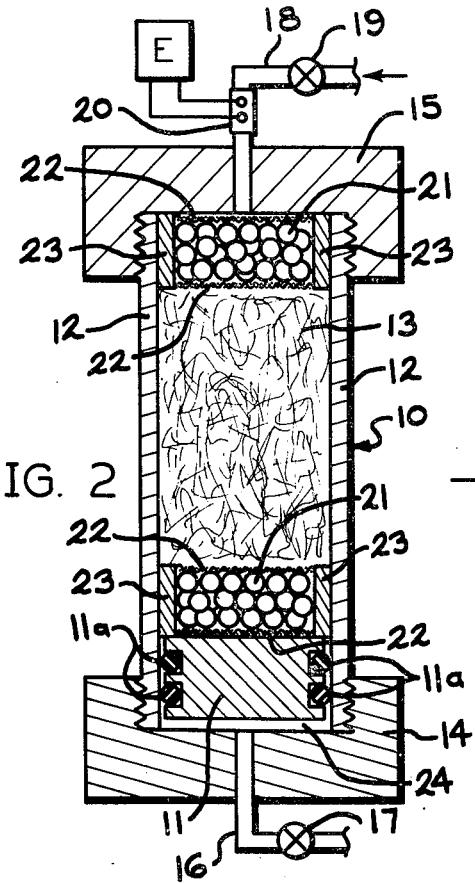
Figure 3:
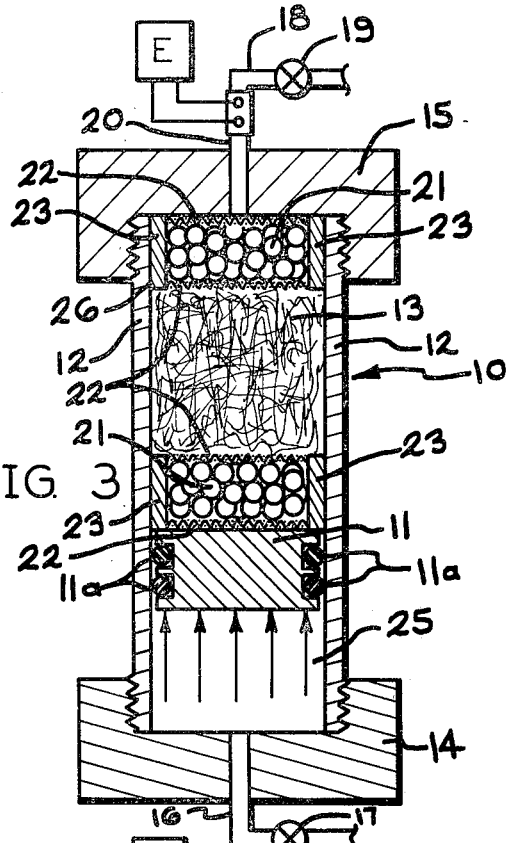
Figure 4:
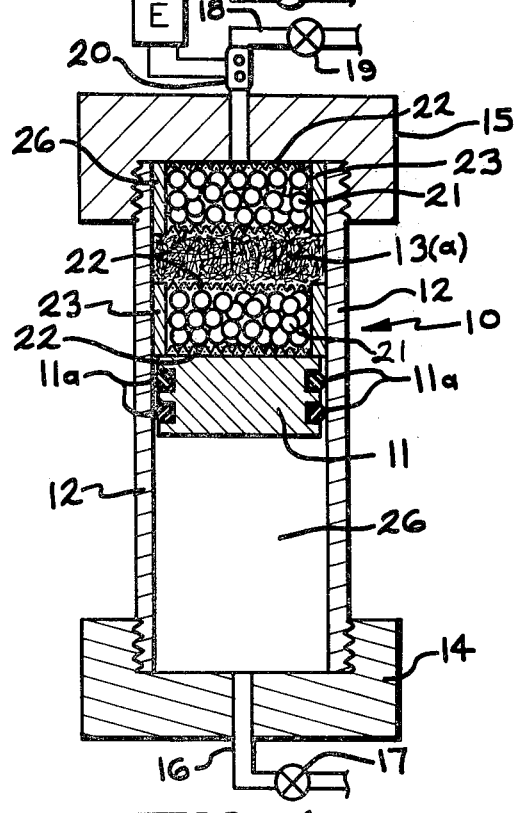

FIGS. 2, 3, and 4 are front cross-sectional views illustrating a preferred apparatus for performing the method of the present invention utilizing a piston in a cylinder forming a confined space for the pieces of material to be bonded with explosion diffusers at both ends of the confined space and illustrating various positions of the piston which is actuated by a non-combustible gas under pressure on the side of the piston outside the confined space for the thermoplastic pieces so as to reduce the volume of the confined space and thus compact and bond pieces upon being heated by the burning of a combustible gas in the confined space and particularly illustrating packed metal spheres as the explosion diffusers on either side of the pieces.

Figure 5:
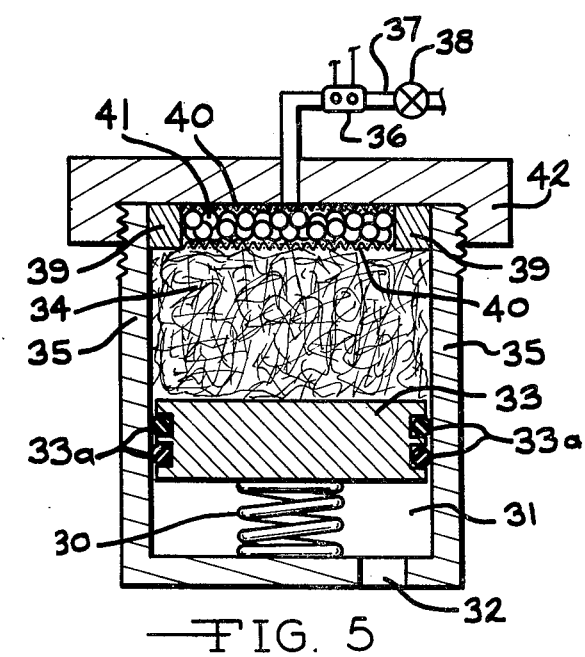

FIG. 5 is a front cross-section view of a free piston apparatus which uses a coil spring as a resilient means for moving the piston as a means for reducing the volume of the confined space to compact the pieces and with an explosion diffuser between the pieces and the means for initiating the ignition of the combustible gas.

DESCRIPTION OF THE INVENTION

The present invention relates to the improved method for the thermal bonding of contacting pieces of a thermoplastic material which comprises: providing contacting pieces of a thermoplastic material in a confined space having a variable volume with an initiator means for igniting the combustible gas externally of the confined space, with an explosion diffuser adjacent the pieces between the initiator means and the pieces, and with a combustible gas around the pieces, igniting the combustible gas with an initiator means so as to transiently heat the pieces to cause them to interbond when compacted; and compacting the pieces while heated by reducing the volume of the confined space so as to cause them to bond. The present invention particularly relates to a method for producing a porous mass formed of the bonded pieces of the thermoplastic material.

An explosion diffuser is a device, provided between the material to be heated and compacted and the external initiator for the combustible gas, which prevents damage to the material by the burning of the combustible gas. Ignition of the combustible gas is external of the material and as a result shock waves develop in any voids in the confined space, such as in gas conduits and in voids adjacent covers. Also, there is a very hot jet of gas generated at the point of ignition of the combustible gas which penetrates and severely damages the material. Unexpectedly it has been found that the explosion diffuser prevents such damage to the material.

The explosion diffuser is preferably constructed from packed metal spheres, such as stainless steel bearings, which are not damaged by the shock waves in the burning combustible gas. Other explosion diffusers can be constructed of a laminate of screens, plates with holes, reticulated three dimensional skeletal structures and other porous structures which provide a tortuous gas flow path between the material and the point of ignition of the combustible gas and also fill any voids in the confined space. Preferably the explosion diffuser is composed of metals or ceramic materials which can withstand the effects of the burning of the combustible gas without being damaged.

The pieces of thermoplastic material which can be bonded by the method of the present invention can be: fibers, including chopped or extended lengths; beads, including hollow or solid types; and irregularly shaped particles and powders. Thermoplastic materials include for instance polyurethanes, polystyrene, polyethylene, polypropylene, cellulose acetate and synthetic rubbers, glass, metal and the like which as a class are well known to those skilled in the art. In general the surfaces of the pieces of these thermoplastic materials must be heated sufficiently by the burning combustible gas to thermoplastically interbond when they are compacted without damaging or destroying them due to the heat. The heating by the combustible gas renders the surfaces thermoplastic and due to the transient nature of the heating is essentially superficial in that only the surfaces are made thermoplastic. Thus pieces of non-thermoplastic materials coated with a thermoplastic material can also be bonded. Many obvious variations for pieces of thermoplastic materials will occur to those skilled in the art.

The combustible gases include decomposable gases as well as mixtures of oxidizable and oxidizer gases. Heating can be used to volatilize liquids to the gaseous state for introduction into the confined space or the confined space can be heated. Included as decomposable gases are for instance nitrogen dioxide and alkyl nitrites. Oxidizable gases particularly include for instance: hydrogen or alkanes, alkenes and alkynes, containing 1 to 10 carbon atoms, such as methane, ethane, propane; pentane, octane, decane, ethylene, propylene, acetylene, methyl acetylene alone or in admixture. Other oxidizable gases include for instance: ammonia, hydrazine, hydrogen sulfide and various hydrocarbon mixtures including gasoline. Oxidizer gases include for instance: air, oxygen, ozone or mixtures thereof, and the halogens, particularly chlorine. Oxygen is preferred as the oxidzer gas. The mole ratios of the oxidizable and oxidizer gases will usually be stoichiometric allowing for complete combustion of the reactants, although other mole ratios can be used depending upon whether oxidizing or reducing conditions are desired with the heating in order to alter the chemistry of the surface of the thermoplastic pieces during or after bonding. In many reactions of combustible gases, water is formed as a by-product which is usually non-contaminating per se and is thus preferred. Where the presence of water is objectionable carbon monoxide for example, can be used as a fuel gas. All of these variations in combustible gas composition will be obvious to one skilled in the art.

The combustible gas preferably undergoes a reduction in gaseous volume upon ignition. This reduction can be produced when fewer moles of individual gases are present in the confined space after ignition than before ignition. A mole of any gas occupies the identical volume under the same conditions of temperatures and pressure. As a result of the reduced gas volume, the heated pieces are more readily compacted. When water is formed there is an added reduction in gas volume due to rapid condensation which also aids in the compaction.

The ignition of the combustible gas can be accomplished by any convenient means. Spark gap devices, particularly automotive spark plugs which are preferred because of low cost, can be used for this purpose.

A variety of means for compacting the pieces non-isostatically are preferably used. Usually a piston is provided in a chamber which forms the confined space. The piston can be driven mechanically, hydraulically, explosively or penumatically. Preferably the pieces are compacted as soon as the combustible gas is ignited. One way to accomplish this is to pre-load the piston so that it is triggered to compact the pieces automatically upon the ignition of the combustible gas. Thus, for instance, the confined space can contain the combustible gas under pressure and the side of the piston outside of the confined space can be subjected to a pressure equal to or greater than the combustible gas pressure. Upon ignition, the pieces are compressed by the pressure on the outside of the piston. Also, various apparatus for isostatically compacting materials are known; however, they are relatively more expensive. The compacting of the heated pieces of thermoplastic material can be accomplished in a variety of ways so as to reduce the volume of the confined space containing the pieces. FIGS. 2 to 5 are illustrative of various apparatus which can be used for this purpose.

FIGS. 2 to 4 show an apparatus 10 including a free piston 11 mounting "O" ring seals 11a in grooves in the piston 11 which is shown at various positions in a cylindrical chamber 12. The chamber 12 is filled with pieces 13 of a thermoplastic material to be compacted and interbonded. The chamber 12 is closed by threaded end caps 14 and 15. Cap 14 includes a conduit 16 with valve 17 and cap 15 includes a conduit 18 with a valve 19. Both conduits 16 and 18 lead inside the chamber 12. Conduit 16 leads to one side of the piston 11 and conduit 18 leads to the other side of the piston 11. A spark gap device 20 (particularly a spark plug) is provided inside the conduit 18 and has an external electrical circuit E.

Small diameter metal spheres 21 are provided on either side of the pieces 13 to be compacted by the piston 11 in the chamber 12. The metal spheres 21 act to diffuse the explosion in the chamber 12 from the ignition of the combustible gas by spark gap device 20. Screens 22 are provided between the spheres 21 and the pieces 13 in the chamber 12 which act to confine the spheres 21 and produce uniformity of compression on the pieces 13 by the spheres 21. For production purposes to provide ease of removal, it is preferred to fully cage the spheres 21 on all sides with screens 22 at both ends and a container 23 on the sides.

FIG. 2 shows the apparatus 10 as it is positioned in step 1 of FIG. 1. The cap 15 is removed for introducing the pieces 13 into the chamber 12 with the caged spheres 21 confining the pieces 13. The valve 19 is opened, air is evacuated from the chamber 12 and a combustible gas is introduced into the chamber 12 around the pieces 13. The valve 19 is then closed. The valve 17 is opened and a non-combustible gas is introduced which pressurizes the piston 11 on the side opposite the pieces 13 at a pressure equal to or greater than the pre-ignition combustible gas pressure and the valve 17 is closed. It will be appreciated that the piston 11 can compact the pieces somewhat due to a pressure of the non-combustible gas greater than the combustible gas pressure as illustrated by the space 24 in FIG. 2.

As shown in FIG. 3, the combustible gas is ignited by the spark gap device 20 at which time the exploding gas moves the piston 11 away from the contacting pieces 13 to be bonded and immediately thereafter the pressure of the exploding gas side of the piston 11 decays and thus immediately the piston 11 is moved by the remaining pressure of the non-combustible gas to compact the heated pieces 13. FIG. 3 shows the dynamic movement of the piston 11 and the expanding space 25. FIG. 4 shows the completely compacted and bonded pieces 13a and the completely expanded space 26 containing the non-combustible gas. The caged spheres 21 thus act as an explosion diffuser to prevent shock waves from damaging the bonded product 13a. Steps 2 and 3 of the method occur in a very rapid sequence and step 3 occurs automatically while the pieces 13 are still heated from the burning of the combustible gas.

FIG. 5 shows a variation from the apparatus 10 of FIGS. 2 to 4. Instead of a non-combustible gas providing the pressure for compacting the pieces 34, a spring 30 is provided in a space 31 with an opening 32 on the outside of a free piston 33, with "O" ring side seals 33a, in a cylindrical chamber 35. A spark gap device 36 is used for combustible gas ignition which is introduced by means of conduit 37 with control valve 38. The opening 32 is provided in the chamber 31 for air movement so as to allow free piston 33 movement. A container 39 and screens 40 confine spheres 41 adjacent the spark gap device 36 on the cover 42.

In operation, the cover 42 is removed and the chamber 35 is packed with the pieces 34. The caged spheres 41 are placed on top of the pieces 34 and the cover 42 threaded on the chamber 35. The valve 38 is opened and combustible gas under pressure is introduced into the chamber 35 through conduit 37 and the valve 38 is closed. The spring 30 compresses under the pressure of the combustible gas. The combustible gas is ignited by spark gap device 36. The caged spheres 41 act as an explosion diffuser and essentially the heat of the combustion melts the surfaces of the pieces 34 without any damaging effects of the explosion. The spring 30 then compresses the pieces 34 to compact and bond them together.

SPECIFIC DESCRIPTION

The following Examples I to III illustrate the present invention.

EXAMPLE I

Filling a chamber in the manner of U.S. Pat. No. 3,175,025 with the beads or the fibers and igniting a combustible gas proved unsatisfactory, particularly because there is a damage resulting from the manner of heating which produces a non-uniform structure coupled with a lancing jet from the burning gases at the gas entrance port from the conduit 18.

To remedy this problem, the apparatus of FIGS. 2 to 4 was developed with the free piston 11. The free piston 11 caused the necessary compaction by its movement.

To fuse 1½ pound per cubic foot (24 kg per cubic meter) bulk volume expanded polystyrene beads together, these steps were followed:

(1) The space 24 which was 2" (5.08 cm) inside diameter, was evacuated of air.

(2) The chamber 12 was filled with beads 13 which were packed snugly together. At both ends of the chamber 12, ⅛ inch (0.33 cm) diameter metal spheres 21 were provided in the container 23 with the screens 22. The packing of the spheres 21 was 1 inch (2.54 cm) deep at the top of the chamber 12 and 2" (5.08 cm) deep at the bottom. The cap 15 was screwed onto the chamber 12.

(3) The chamber 12 was evacuated of air and then filled with a 3:1 by volume (mole) ratio of hydrogen and oxygen to a pressure of 15 psig (2 atmospheres absolute).

(4) The space 24 was filled with nitrogen gas to a pressure of 30 psig (3 atmospheres absolute).

(5) The combustible gas was ignited and the chamber was allowed to cool. Both chamber 12 and space 26 were vented simultaneously by opening valves 17 and 19 and then the caps 14 and 15 were removed and the piston 11 used to force the product 13a from the chamber 12. The undamaged product had firmly interbonded beads 13a and was porous.

EXAMPLE II

To bond 200 denier by ¼" (0.635 cm) long polypropylene fibers together, the apparatus of FIG. 5 was used. A coiled compression spring 30 was placed between the free piston 33 and the end of the chamber 31. The spring 30 had a spring rate of approximately 575 lbs/in ($1.03 \times 10^4$ kg per meter). An explosion diffuser of packed ⅛ inch (0.33 cm) spheres 41, 1 inch (2.54 cm) deep was used adjacent the spark gap device 36. With this apparatus, the following steps were followed:

(1) The chamber 35 was filled with fibers 34 and packed tightly. The cover 42 was placed on the chamber 35.

(2) The chamber 35 was evacuated, then filled with a 3:1 by volume (mole) ratio of hydrogen and oxygen to a pressure of 200 psig (14.6 atmospheres absolute).

(3) The combustible gas was then ignited. The fibers were well bonded together.

An attempt was made to fuse 15 and 6 denier polypropylene fibers together by the method of Example II but with limited success because of packing and fiber orientation difficulties.

A problem encountered in the prior art method of U.S. Pat. No. 3,175,025 was that at the point where the combustible gas enters the chamber 12 from the spark gap 20 and conduit 18, the pieces of material 13 are melted or burned away. Apparently the small hole in the conduit 18 where the gas enters the combustion chamber 12 acts as a nozzle and focuses a stream of hot gases on one point of the material 13 beneath it, thus causing it to melt or burn away. This problem was alleviated by installing the spheres 21 or 41 in the top of the chamber. It was found that a 1" deep explosion diffuser of ⅛ inch (0.33 cm) steel spheres 21 or 41 was satisfactory in this position.

Also, referring to FIGS. 2 to 4, when the combustible gas is detonated in the chamber 12 or confined space, the shock wave propagates down through the chamber 12 even in the presence of the pieces 13. The shock wave reflects off the piston 11 into itself and is intensified. This causes a concentration of energy at the piston 11. When an explosion diffuser was not installed on the piston 11, at pre-ignition combustible gas pressures of about 100 to 200 psig (7.8 to 14.6 atmospheres absolute) it was noticed that the samples being fused were being melted or burned near the piston 11. A 1" thick by 2" (2.54 to 5.08 cm) diameter explosion diffuser of spheres 21 was placed in the piston 11. This helped but did not solve the problem entirely since there was some damage adjacent to the piston 11. A 2" thick by 2" (5.08 cm by 5.08 cm) diameter explosion diffuser of spheres 21 was used and very good results were obtained.

EXAMPLE III

Another variation for fusing the 200 denier polyethylene fiber as in Example I was tried. The chamber 12 was filled about three-quarters full. The chamber 12 was evacuated, and charged to a pressure of 100 psig (7.8 atmospheres absolute) with a 3:1 by volume mixture of hydrogen and oxygen. The space 24 was filled with nitrogen to a pressure of 230 psig (16.8 atmospheres absolute). The pressure in the chamber 12 was 180 psig (13.2 atmospheres absolute) so the fibers were being compressed by a pressure of about 50 psi (3.6 atmospheres absolute). The combustible gas was ignited. The product was removed from the chamber 12 and the fibers were quite strongly bonded together and undamaged. Bonding the fibers in this manner allows the porosity of the final structure to be easily varied by changing the non-combustible gas pressure.

As can be seen from the foregoing examples the method of the present invention provides undamaged bonded products. Other obvious variations will be apparent from these Examples and the description.

We claim:

1. In an apparatus for heating a material in a confined space defined by a chamber with an initiator provided in an inlet conduit to the confined space through the chamber for introducing a combustible gas through the conduit to the confined space and for ignition of the combustible gas by the initiator in the conduit and the confined space, the improvement which comprises:
   (a) an explosion diffuser providing a tortuous gas flow path positioned between the inlet conduit and the material in the confined space so as to prevent damage by burning of the combustible gas upon ignition by the initiator; and
   (b) means for compacting the material while it is heated in the confined space.

2. Apparatus for compacting and heating a compressible material which comprises:
   (a) a chamber including a removable cover for confining the material to be compacted and heated;
   (b) a moveable piston having sides fitted to the chamber so as to define a variable volume sealed confined space with the cover for compacting the material;
   (c) an inlet conduit through the cover into the confined space for providing a combustible gas in the confined space;
   (d) an initiator in the inlet conduit for igniting the combustible gas;
   (e) an explosion diffuser providing a tortuous gas flow path positioned between the inlet conduit and the material in the confined space so as to prevent damage to the material upon the ignition of the combustible gas by the initiator; and
   (f) means for moving the piston to compact the material while being heated from burning of the combustible gas in the confined space.

3. The apparatus of claim 2 wherein in addition an explosion diffuser is provided between the material to be compacted and heated and the piston.

4. The apparatus of claim 3 wherein the explosion diffuser is packed metal spheres which resist damage from burning of the combustible gas.

5. The apparatus of claim 4 wherein the spheres are composed of stainless steel.

* * * * *